Sheet 1, 2 Sheets.

W. H. Stevenson.
Mower.

No. 3,013. Reissued Aug. 18, 1868.

Witnesses.
R. E. Campbell
Edw. Schafer

Inventor
W. H. Stevenson
by
Mason, Fenwick & Lawrence

N. PETERS, PHOTO-LITHOGRAPHER, WASHINGTON, D. C.

Sheet 2, 2 Sheets.

W. H. Stevenson.
Mower.

No. 3,093. Reissued Aug. 18, 1868.

Witnesses
R. S. Campbell
Edw. Schafer

Inventor
W. H. Stevenson
by
Munn, Pennick & Seymour

N. PETERS, PHOTO-LITHOGRAPHER, WASHINGTON, D. C.

UNITED STATES PATENT OFFICE.

WILLIAM H. STEVENSON, OF AUBURN, NEW YORK.

IMPROVEMENT IN HARVESTERS.

*Specification forming part of Letters Patent No.* 75,070, *dated March* 3, 1868; *reissue No.* 3,093, *dated August* 18, 1868.

*To all whom it may concern:*

Be it known that I, WILLIAM H. STEVENSON, of Auburn, in the county of Cayuga and State of New York, have invented certain new and useful Improvements in Harvesting-Machines, of which the following is a full, clear, and exact description, reference being had to the accompanying drawings, which make part of this specification, and in which—

Figure 1:
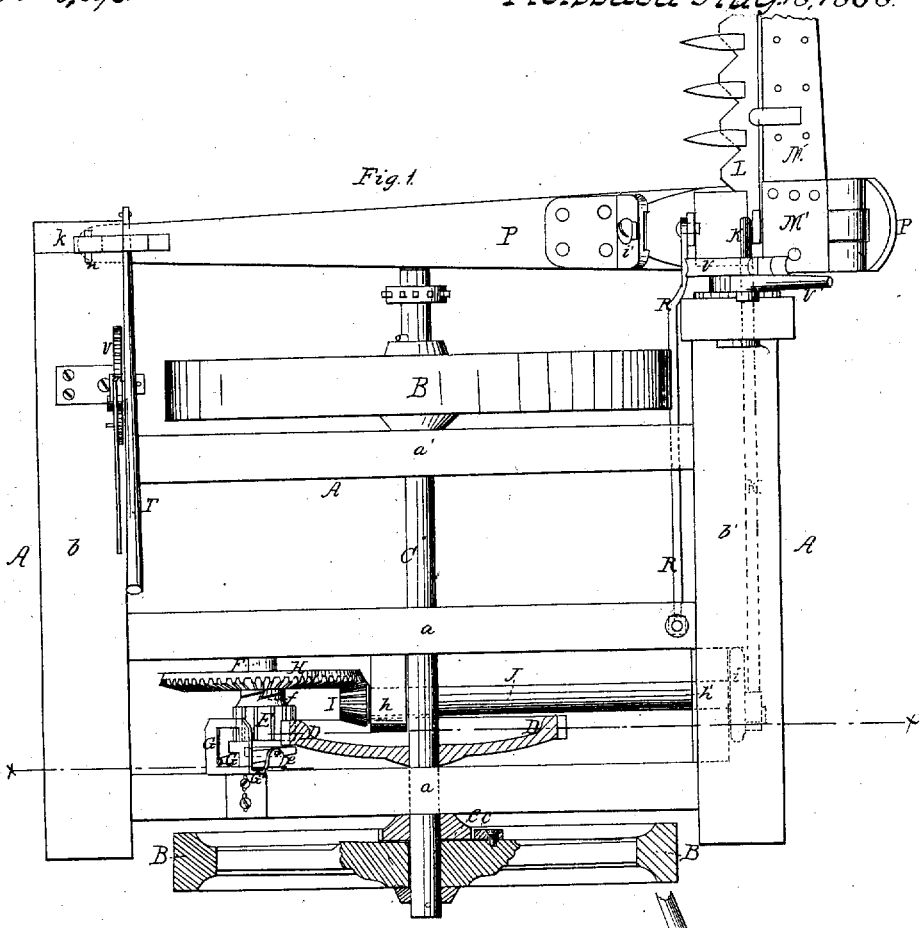
Figure 2:
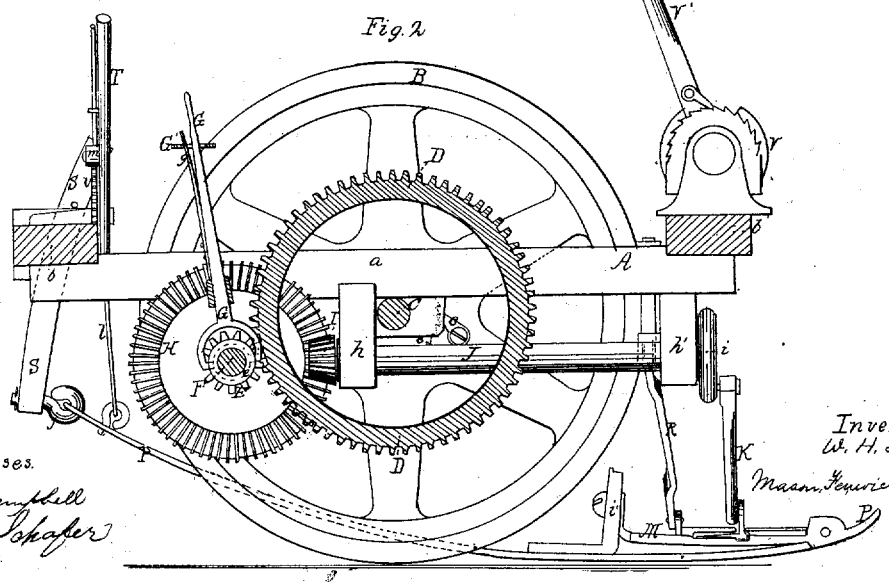
Figure 3:
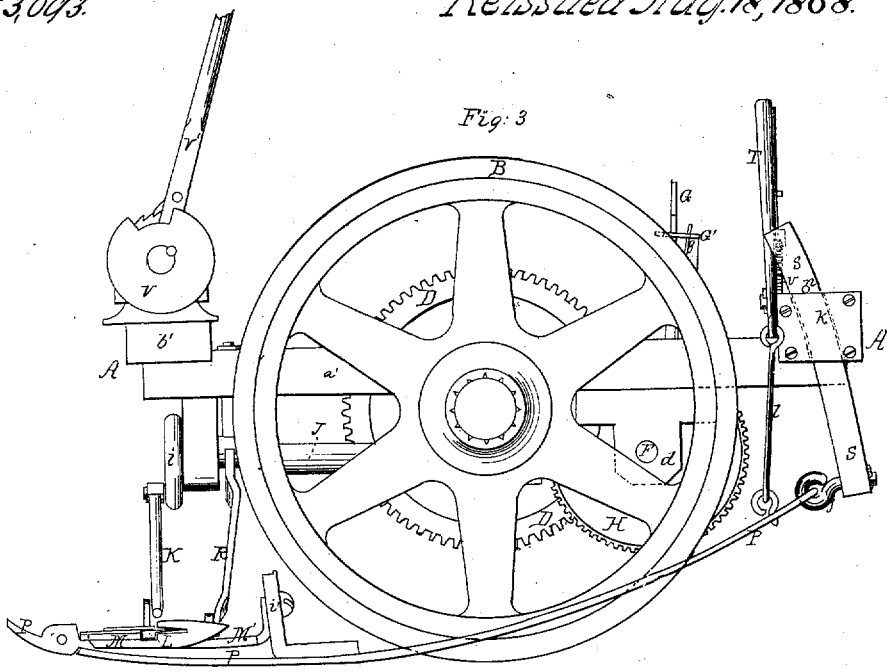
Figure 4:
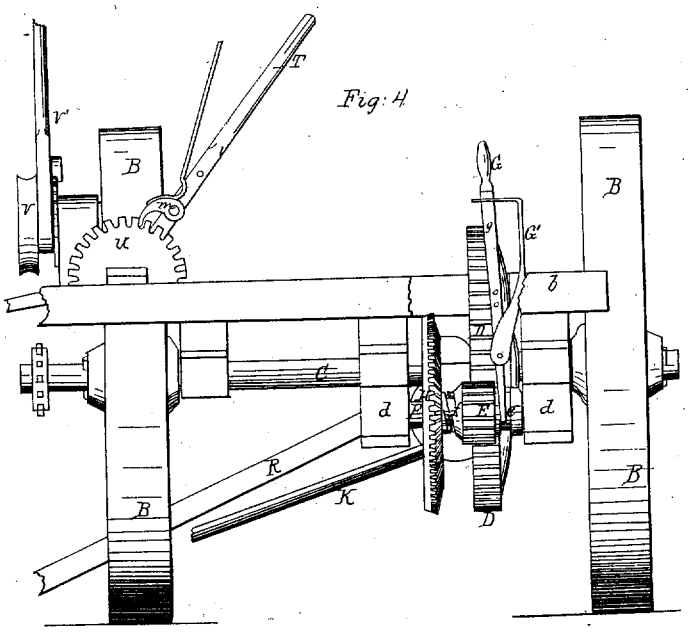

Figure 1 represents a plan or top view of so much of a harvester embracing my improvements as is necessary to illustrate my invention, one of the driving-wheels and the main gear-wheel being shown in section. Fig. 2 represents a vertical section through the machine in the line $x$ $x$ of Fig. 1. Fig. 3 represents a view, in elevation, of the grain side of the machine, showing my improved mode of connecting the front end of the drag-bar with the main frame. Fig. 4 represents a view, in elevation, of the machine as seen from the front, with portions of the machine removed or broken away to show the other parts more clearly.

My invention relates to that class of harvesters known as two-wheeled hinge-joint machines, in which a laterally-projecting finger-beam is connected by hinged or jointed couplings with a main or draft frame, mounted on two wheels, which serve both to support the main frame and to drive the gearing, the connection between the finger-beam and main frame being such as to allow either end of the finger-beam to rise or fall independently of the other, or of the main frame, that the finger-beam may conform freely to the undulations of the surface of the ground over which it is drawn.

The improvements herein claimed consist, first, in a novel method of constructing the gearing by combining with a large driving spur-wheel, mounted on the main axle, and dished on one side, a spur-pinion on a short counter-shaft parallel with the main axle, and a bevel-wheel on the counter-shaft gearing into a corresponding pinion on a crank-shaft arranged underneath the main axle, transversely thereto, and with its pinion partially within the dished face of the main driving-gear, whereby I secure a strong, compact arrangement of the gearing; second, in a novel method of combining with a dished spur-wheel on the main axle a spur-pinion running loosely on the counter-shaft, on which it is moved endwise by a shipping-lever, and provided with a clutch to throw it into or out of gear, with a bevel-wheel mounted on the counter-shaft, and driving a pinion on the crank-shaft, substantially as hereinafter set forth; third, in a novel method of combining the shipping-lever, which throws the mechanism into or out of gear, with a bracket-frame guide or holder, constructed in one piece, and secured to the main frame by bolts passing through a slot or slots in the plate, whereby the shipper is rendered adjustable; fourth, in a novel method of combining with the drag-bar a lifting-lever, mounted on the main frame, and attached to the forward end of the drag-bar by a linked connection, and an arc-shaped bar connected with the drag-bar by a swivel-joint, and sliding endwise in a guide-box mounted on the main frame.

In the accompanying drawings the main or draft frame A is shown as composed of three parallel longitudinal beams, $a$ $a$ $a'$, arranged inside the driving-wheels B, and connected at their ends by transverse beams $b$ $b'$. This frame rests upon two driving-wheels, B, mounted on an axle, C, with which they are connected by backing-ratchets, in the usual way.

A large spur-wheel, D, is keyed on the main axle, between the beams $a$. This wheel has its arms curved or dished on one side, for a purpose hereinafter described. It drives a spur-pinion, E, running loosely on a short counter-shaft, F, parallel to the axle C, and having its bearings in boxes $d$ $d$, beneath the two beams $a$ $a$. The pinion has an annular-grooved collar, $e$, on one end, and a ratchet-clutch, $f$, on the other, which clutching-face engages a corresponding one on the hub of a bevel-wheel, H, keyed fast to the counter-shaft F, and driving a corresponding pinion, I, on the front end of a crank-shaft, J, supported in bearings $h$ $h'$ underneath the frame. The cutters are driven by a crank or wrist pin, $i$, and pitman K, in the usual way.

By the above-described mode of constructing the gearing the main gear-wheel D and crank-shaft J are brought close to the outer frame-timber *a*. The pinion I lies partly inside the plane of the gear-wheel. A short counter-shaft only is required, and the bevel-wheel H lies close to the main gear-wheel D. I thus not only secure a strong, compact arrangement of the gearing, but, by increasing the distance between the heel of the cutter and the crank-shaft, diminish the angle of inclination of the pitman to the cutter, and thus cause the latter to run easily. I make no claim to arranging the crank-shaft below the main frame.

The mechanism is thrown into or out of gear by a shipping-lever, G, the forks of which embrace the collar *e* of the pinion E, which slides endwise on its shaft. The shipping-lever is pivoted at *g'* in a bracket-frame, $G^1$, on the outer frame-timber *a*, provided with recesses to hold the lever either in or out of gear. A spring, *g*, retains the lever in either of the notches. The bracket-frame $G^1$ is all cast in one piece, and has a projecting flange, $G^2$, which secures it to the main frame by means of bolts or set-screws passing through one or more slots in the flange. By this device the bracket-frame can be adjusted toward or from the bevel-wheel H. The mechanism is thrown into or out of gear by the driver moving the lever G from his seat on the main frame.

The finger-beam is rigidly secured to a plate, M', hinged at its back to the drag-bar P, while its front end is adjusted in a standard, *i'*, in the usual way, so as to vary the inclination of the guards relatively to the ground.

A transverse coupling-arm, R, hinged at both ends, connects the finger-beam and main frame, as usual in this class of machines. By these devices the cutting apparatus is allowed the motion common to double-hinge-joint machines.

Instead of the usual slotted bracket extending below the main frame for the front end of the drag-bar to play in, I attach the swivel *j* to the lower end of a bar, S, curved in the arc of a large circle, and sliding endwise through a guide-box, K, on the inner front corner of the main frame. A pin, *n*, passing through any one of a series of holes in the bar S, prevents the front end of the drag-bar from dropping below a given point, but allows it to rise freely when required.

The guide-box K, it will be observed, projects beyond the main frame, and its bottom is above the level of the lower side of the frame. Owing to this construction, the drag-bar may be lifted until the swivel *j* strikes the bottom of the guide-box. When thus lifted the space below the frame is unobstructed, as the bar S also rises. The advantages of this arrangement over a bracket projecting below the frame, which does not rise with the drag-bar, are obvious.

The drag-bar is suspended by means of a link, *l*, attached to a balance-lever, T, pivoted on the main frame, near its inner front corner, and extending transversely across the machine. A pawl, *m*, pivoted on the lever, engages with the teeth of a sector-rack, V, and holds the drag-bar at the desired elevation. A handle, *m'*, releases the pawl when desired. The finger-beam may be raised or lowered by a lifting-lever, V', on the rear of the main frame.

What I claim is—

1. The combination, with a dished driving spur-wheel, D, of a spur-piniom, E, bevel-wheel, H, and bevel-pinion, I, which will admit of the arrangement of the crank-shaft J, substantially as and for the purposes specified.

2. The arrangement of the gear-wheels D E H I, the wheel E, running loosely on a shaft, F, and being provided with a clutching-face, *f*, and shipping-lever G, substantially as desired.

3. The adjustable shifter, holder, and guide $G^1$, constructed in one piece, and attached to the main or draft frame by bolts passing through one or more slots in the shifting-plate $G^2$, whereby the shifter-fork may be adjusted to the groove in the spur-pinion, substantially as described.

4. The combination of the adjusting-lever T, linked connection L, and curved guide S, the latter working endwise in a guide-box, K, on the frame, with the drag-bar P, substantially in the manner shown and described.

Witnesses: WM. H. STEVENSON.
JOS. J. PEYTON,
BALTIS DE LONG.